(12) United States Patent
Imamura et al.

(10) Patent No.: US 7,441,565 B2
(45) Date of Patent: Oct. 28, 2008

(54) FIRE PROTECTION ZONE PENETRATING MEMBER AND INJECTION-MOLDING METHOD FOR THE SAME

(75) Inventors: Minoru Imamura, Tokyo (JP); Nobuki Yagishita, Tokyo (JP)

(73) Assignee: Tosetz Co., Ltd, Tokyo (JP)

( * ) Notice: Subject to any disclaimer, the term of this patent is extended or adjusted under 35 U.S.C. 154(b) by 1043 days.

(21) Appl. No.: 10/655,238

(22) Filed: Sep. 4, 2003

(65) Prior Publication Data

US 2004/0069507 A1  Apr. 15, 2004

(30) Foreign Application Priority Data

Sep. 5, 2002  (JP) .............................. 2002-260195

(51) Int. Cl.
*F16L 11/00* (2006.01)

(52) U.S. Cl. ...................... 138/110; 138/156; 138/128; 138/151; 169/48

(58) Field of Classification Search ................ 138/110, 138/156, 151, 128; 69/48; 428/36.9; 68/48; 169/48

See application file for complete search history.

(56) References Cited

U.S. PATENT DOCUMENTS

| | | | | |
|---|---|---|---|---|
| 2,229,849 A | * | 1/1941 | Heidebrecht | 174/84 R |
| 2,236,208 A | * | 3/1941 | Creel | 74/566 |
| 3,823,255 A | * | 7/1974 | La Gase et al. | 174/113 R |
| 4,424,867 A | * | 1/1984 | Mallow | 169/43 |
| 4,676,025 A | * | 6/1987 | Mattscheck et al. | 49/477.1 |
| 4,830,061 A | * | 5/1989 | Karakawa | 138/168 |
| 5,560,397 A | * | 10/1996 | Miller et al. | 138/110 |
| 5,634,304 A | * | 6/1997 | Sakno | 52/232 |
| 6,158,476 A | * | 12/2000 | Sjotun | 138/126 |

FOREIGN PATENT DOCUMENTS

| | | |
|---|---|---|
| EP | 931568 A1 * | 7/1999 |
| GB | 2 219 838 | 12/1989 |
| JP | 61-68630 | 5/1986 |

(Continued)

OTHER PUBLICATIONS

PCT WO98/58704, Sawada, Hirotaka, Dec. 30, 1998.*

*Primary Examiner*—Patrick F Brinson
(74) *Attorney, Agent, or Firm*—McGlew & Tuttle, P.C.

(57) ABSTRACT

A low cost and mass-producible fire protection zone penetrating member is provided which can be set on piping or the like with a one-touch operation as well as a method of injection-molding the fire protection zone penetrating member. One expanding slot is provided on a cylindrical body made from thermally expanding graphite, thermally expanding rubber, or thermally expanding resin as a main ingredient thereof. The slot extends in a longitudinal direction. A piping inlet section is formed at an entrance of the expanding slot so that piping can be set in or taken out from inside the member by means of a one-touch operation. The fire protection zone penetrating member has the configuration as described above and is manufactured with an injection molding machine. The cylindrical body as a main body of the fire protection zone penetrating member may have an oval cross section, so that the fire protection zone penetrating member can be applied to piping having a diameter in a wide range. With this feature, a number of required types of the product can be reduced with the unit production cost lowered.

3 Claims, 8 Drawing Sheets

FOREIGN PATENT DOCUMENTS

| | | |
|---|---|---|
| JP | 8-245833 | 9/1996 |
| JP | 10-89545 | 4/1998 |
| JP | 11-307997 | 11/1999 |
| JP | 2000-92609 | 3/2000 |
| JP | 2000-286565 | 10/2000 |
| JP | 2001-280550 | 10/2001 |

* cited by examiner

FIRE PROTECTION ZONE PENETRATING MEMBER AND INJECTION-MOLDING METHOD FOR THE SAME

FIELD OF THE INVENTION

The present invention relates to a fire protection zone penetrating member which can easily be mounted or removed by hand and a method of injection-molding the same.

BACKGROUND OF THE INVENTION

The fire protection zone penetrating member is installed in piping or a cable provided in a fire protection zone, for the purpose to prevent flame, gas, smoke or the like from spreading via a through-holes provided in the piping or cable, at the through-hole when a fire breaks out. When a fire breaks out, the fire protection zone penetrating member expands due to the heat of the fire, and clogs the through-hole. Generally thermally expanding rubber or thermally resin is used as a material for the fire protection zone penetrating member.

The conventional type of fire protection zone penetrating member is accommodated within a square or circular metallic casing. One based on a simple construction is now pending under the Japanese Patent Application No. H08-245833. This fire protection zone penetrating member now under patent application is based on a one-touch operation system having a thermally expanding member provided on a C-shaped elastic metal plate. This fire protection zone penetrating member can easily be mounted, but the thermally expanding member is mounted on the metal plate later, so that a long time is required for manufacturing the same.

To solve this problem, the present inventor has applied the Japanese Patent Application No. 2000-92609 (Japanese Patent Laid-Open Publication No. 2001-280550) for a fire protection zone penetrating member manufactured by slicing a lengthy cylindrical body and providing an expanding slot on each of the sliced portions so that the cost can be minimized and the member can be mounted with a one-touch operation.

For manufacturing this type of fire protection zone penetrating member, however, as a thermally expanding material is extruded from an extruder to form a lengthy cylindrical body. The lengthy cylindrical body is sliced, a long period of time is required for manufacturing it. In addition sometimes problems occur that the elasticity is not sufficient in the extrusion-molded product, or that, in a case where, for instance, a product with a metal sheet adhered on the surface is to be produced, the metal sheet is required to be adhered thereto later. Further as only one expanding slot is provided in the fire protection zone penetrating member, it is necessary, when mounted on piping, to open the expanding slot to the size allowing the piping to pass therethrough, and to open the expanding slot to the outer diameter of the piping, the work must be done with two hands, so that the operation for mounting it on piping is very troublesome. In addition, when removing it from the piping, it is necessary to insert a driver or other specific tool for opening, and also a large work load is required for removing it from the piping, which is disadvantageous.

In the fire protection zone penetrating member having a cylindrical form, the cross section is round, and it can be opened along and making use of the expanding slot, so that displacement never occurs after mounting when the outer diameter of the piping to which the member is mounted is equal to or larger than an inner diameter of the fire protection zone penetrating member. When the outer diameter of the piping is smaller than the inner diameter of the fire protection zone penetrating member, the joint between the two components is loose, and the position can not be fixed in application. In this case, especially when the member is mounted on vertical piping, the member may drop downward due to the gravity, and to prevent this trouble, it is necessary to temporally fix the member with mortar or putty, and this work also required an additional work load.

Further a number of fire protection zone penetrating members having different sizes respectively must be prepared, so that many types of members are required, which results in higher production cost.

OBJECT OF THE INVENTION

It is an object of the present invention to provide a fire protection zone penetrating member which can easily be mounted and removed by means of a one-touch operation to and from piping having various diameters respectively in a wide range as well as to provide a method of injection-molding the same.

DETAILED DESCRIPTION OF THE PREFERRED EMBODIMENTS

A main ingredient of the thermally expanding section is thermally expanding graphite, thermally expanding rubber, or the so-called thermally expanding resin, and the example composition is as shown in Table 1.

TABLE 1

| Components of thermally expanding rubber | Blending ratio by weight (%) |
| --- | --- |
| Flame-resistant rubber (Chloroprene rubber) | 40-50% |
| Inorganic filler (Aluminum silicate, silicic acid etc.) | 10-15% |
| Inorganic expanding material (graphite-based) | 20-25% |
| Softener (paraffin-based) | 10-15% |
| Metal oxide (zinc oxide, magnesium oxide) | 3-5% |
| Antiaging stuff | 0.5-1.0% |
| Valcanization accelerator | 0.5-1.0% |

The thermally expanding graphite, thermally expanding rubber, and thermally expanding resin are melted at a temperature not higher than that at which thermal expansion occurs and are formed into a cylindrical form with an injection molding machine, and an extruder (cylinder) and a die each used for molding the normal thermoplastic resin can be used for injection-molding the materials.□

It is preferable to form the expanding slot with the minimum width assuming that the slot expands according to an outer diameter of piping on which the cylinder is set. However, the desired performance may not be achieved when the cylinder is set, if the expanding slot expands excessively. Therefore sometimes it is required to prepare several types of cylinders with expanding slots each having a different size respectively. It is to be noted that the problem can be mitigated by forming the cylindrical body with an oval form.

The diagonal cut as a piping inlet section provided at an edge of the expanding section may be a linear one or a slightly arched one. Further the diagonal cut may be provided by cutting a corner of the edge section or by cutting both of the corner sections so that a V-shaped cut section is provided there. In addition, the cut section may be provided either in one side of an entrance the expanding slot or in both sides of the entrance, so that the piping can be set in or removed from either side.

When the fire protection zone penetrating member is set on piping or the like, the diagonally cut section provided at an entrance of the expanding slot is pressed in the diagonal direction against the piping or the like, the expanding slot opened due to actions of the diagonally cut section. Further, when the fire protection zone penetrating member is pressed to the piping or the like along the expanding slot keeping the posture of the fire protection zone penetrating member in the slanted position against the piping or the like, the expanding slot gradually opens from the diagonally cut section, so that the piping or the like can easily be accommodated therein.

Further, when removing, the fire protection zone penetrating member is pulled off from the piping inlet section side.

The cylinder having an oval cross section can be applied to piping having a diameter equal to or larger than a smaller diameter of the oval on the condition that the cylinder can be applied to the piping when the cylinder is opened at the expanding slot.

EXAMPLE 1

Figure 1A:
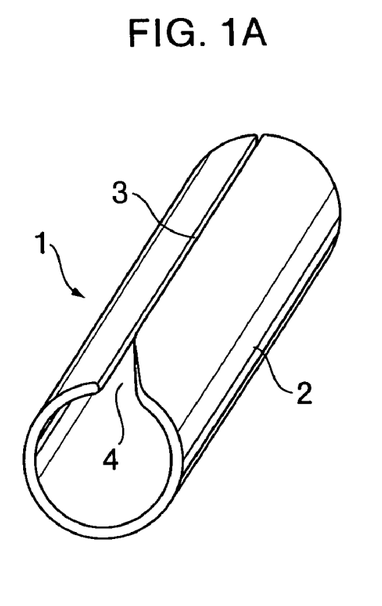
FIG. 1(A) is a perspective view showing a general configuration of a fire protection zone penetrating member according to an embodiment of the present invention☐
Figure 1B:
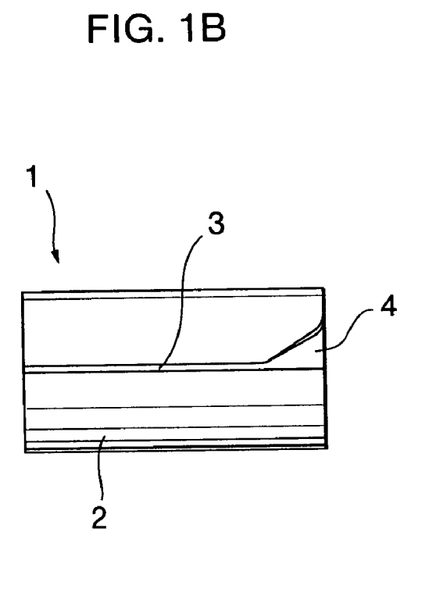
FIG. 1(B) is a flat view showing the member of FIG. 1(A)

A fire protection zone penetrating member 1 has an expanding slot 3 provided on its cylindrical body 2 and extending in the longitudinal thereof as shown in FIG. 1(A) and FIG. 1(B). A piping inlet section 4 is provided by cutting a corner of one edge of the expanding slot 3.

Figure 2:
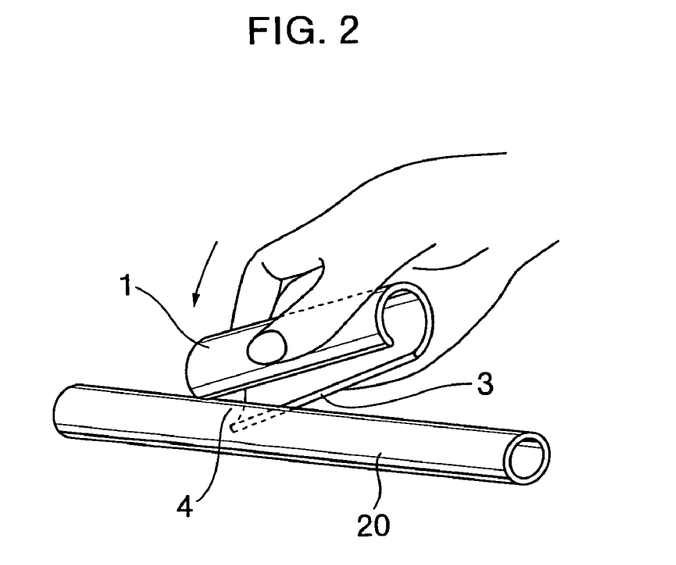
FIG. 2 is an explanatory view showing the state where a fire protection zone penetrating member is being set on piping.
Figure 3:
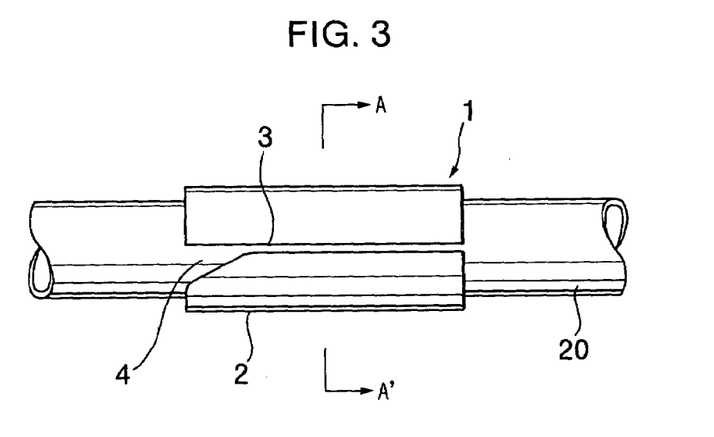
FIG. 3 is an explanatory view showing the state where the fire protection zone penetrating member has been set on the piping.
Figure 4:
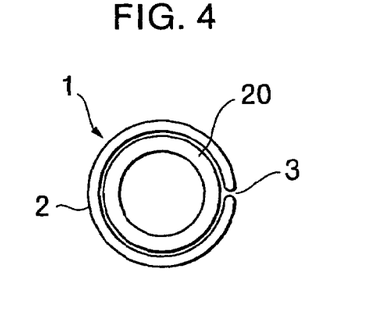
FIG. 4 is a cross-sectional view taken along the line A-A'.

When the fire protection zone penetrating member 1 is set on piping 20, the piping inlet section 4 is pressed to the piping 20 keeping the posture of the fire protection zone penetrating member 1 in the slanted state and is slid along the expanding slot 3 gradually falling the member 1 toward the piping 20, when the expanding slot 3 gradually opens and the piping 20 is accommodated within the member 1. FIG. 3 and FIG. 4 show the state where the piping 20 has been set within the fire protection zone penetrating member 1.

Figure 5:
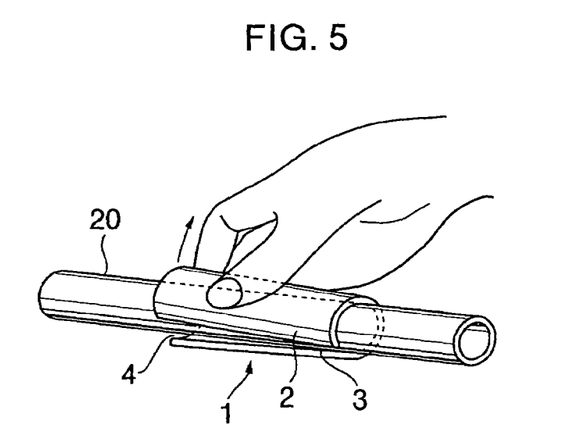
FIG. 5 is an explanatory view showing the state where the fire protection zone penetrating member is being removed from the piping.

When the fire protection zone penetrating member 1 is removed from the piping 20, it can be removed therefrom by raising the side of the piping inlet section 4 to gradually open the expanding slot 3 from the side of this piping inlet section 4.

Figure 6A:
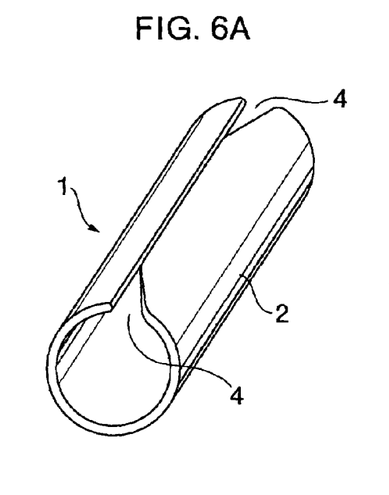
FIG. 6(A) is an explanatory view showing a case in which a piping inlet section is formed at each of the two edges of an expanding slot.
Figure 6B:
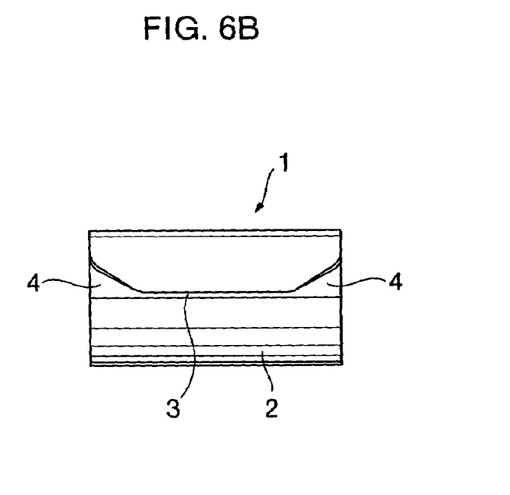
FIG. 6(B) is a flat view showing the section of FIG. 6(A)
Figure 7A:
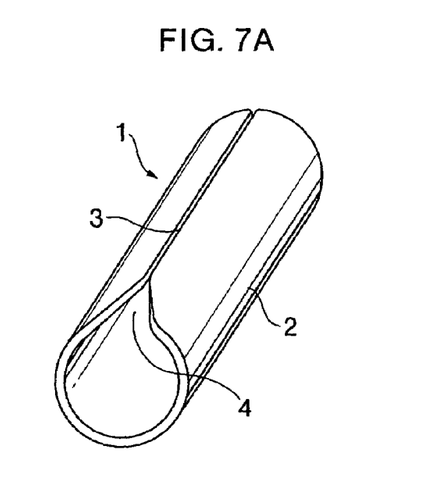
FIG. 7(A) is an explanatory view showing a V-shaped piping inlet section formed at an edge of the expanding slot.
Figure 7B:
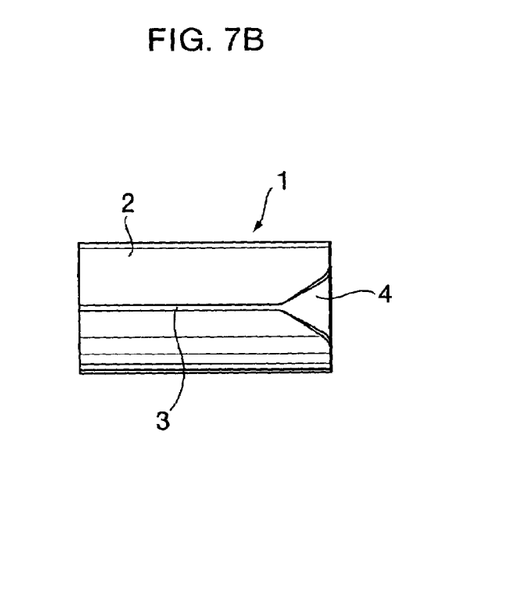
FIG. 7(B) is a flat view showing the section of FIG. 7(A)
Figure 8A:
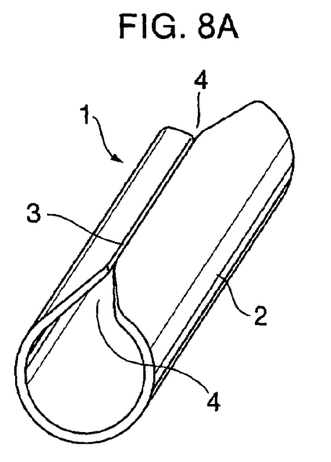
FIG. 8(A) is an explanatory view showing a case where the V-shaped piping inlet section is formed at each of the two edges of the V-shaped expanding slot.
Figure 8B:
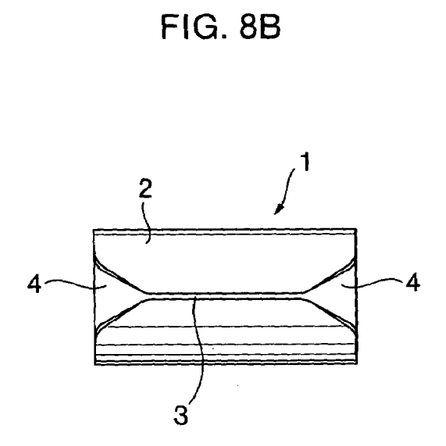
FIG. 8(B) is a flat view showing the section of FIG. 8(A)

FIG. 6(A) and FIG. 6(B) show a case where the piping inlet sections 4 are provided at two edge sections of the expanding slot 3 (according to claim 3; FIG. 7(A) and FIG. 7(B) show a case where a V-shaped piping inlet section 4 is provided at an edge of the expanding slot 3; and FIG. 8(A) and FIG. 8(B) shows a case where the V-shaped piping inlet sections 4 are provided at both edges of the expanding slot 3.

Although each of the piping inlet sections 4 in the examples above is straightly cut, the piping inlet section 4 may be cut in an arched form.

Figure 9A:
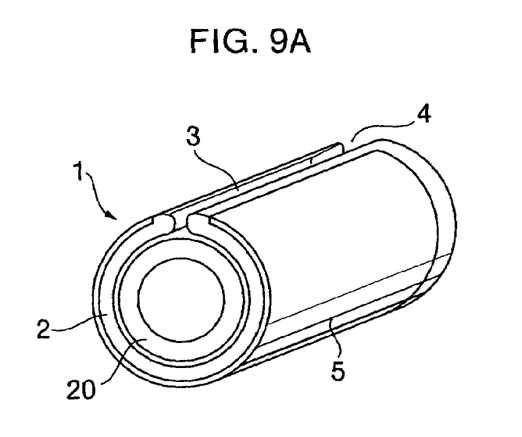
FIG. 9(A) is an explanatory view showing a case where a metal plate has been adhered to the substantially entire surface of an external peripheral surface of the fire protection zone penetrating member.
Figure 9B:
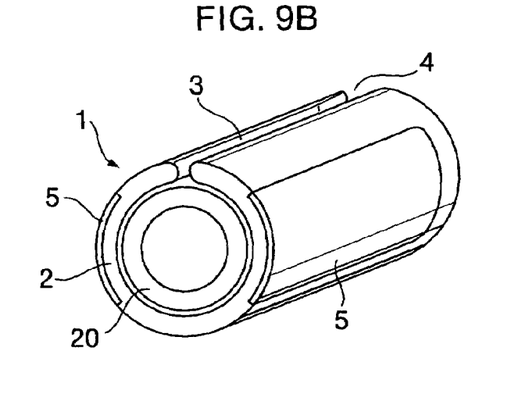
FIG. 9(B) is an explanatory view showing a case where metal plates are adhered on the two side faces of the fire protection zone penetrating member.

FIG. 9(A) and FIG. 9(B) respectively show a case where a metal plate 5 is attached to the substantially entire external peripheral surface or on both side faces of the fire protection zone penetrating member 1, and FIG. 9(A) shows a case where the metal has been attached to the substantially entire peripheral surface of the fire protection zone penetrating member 1, while FIG. 9(B) shows a case where the metal sheets are attached to both side faces of the fire protection zone penetrating member 1.

Figure 10:
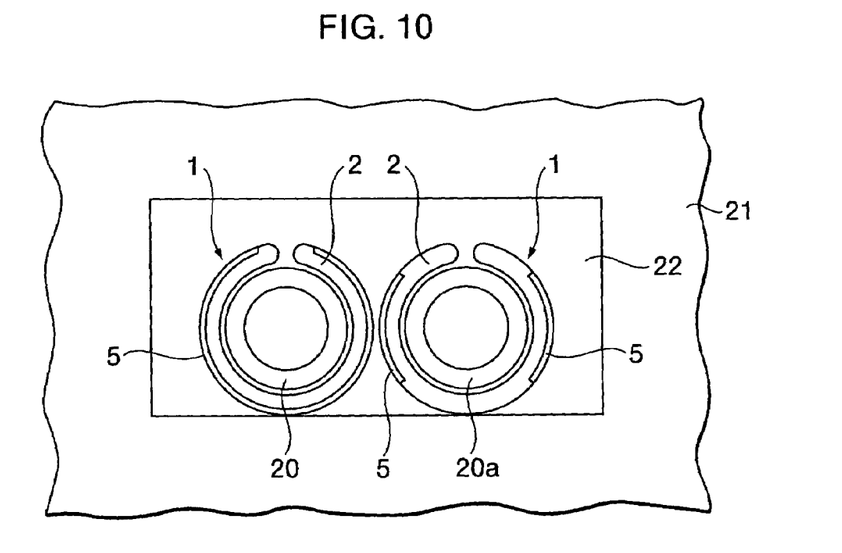
FIG. 10 is an explanatory view showing a case where piping is protected from fire with a fire protection zone penetrating member with a metal plate adhered thereon.

The configuration in which the metal plate 5 is attached to the external peripheral surface of the fire protection zone penetrating member 1 is employed to prevent the error that, when two piping 20, 20a are inserted through a through-hole on a fire protection zone partition wall 21, if the fire protection zone penetrating members 1 set on the adjoining two piping thermally expand and directly each other, the two sections interfere each other to spoil the performance. Therefore, when only one piping requiring fire protection is installed, the fire protection zone penetrating member 1 having no metal plate 5 attached thereto may be used.

Figure 11:
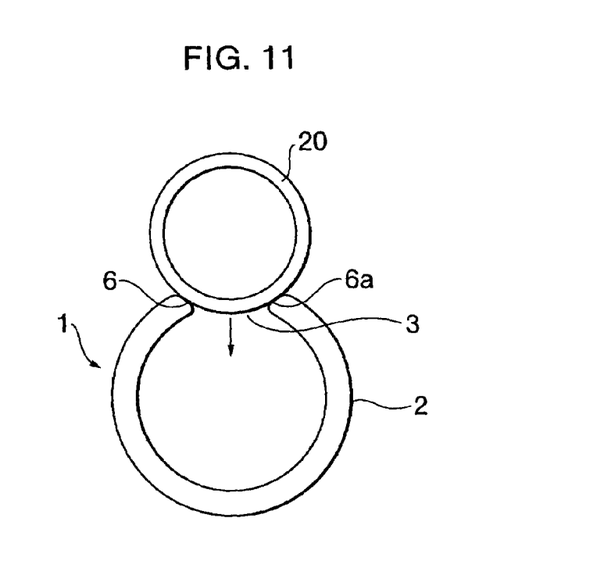
FIG. 11 is an explanatory view showing another case where a V-shaped cut is provided along the expanding slot.

FIG. 11 shows a case where V-shaped cut sections 6, 6a are provided along the expanding slot 3 in the longitudinal direction, and in this case when the piping 20 is pressed to the expanding slot 3, the fire protection zone penetrating member 1 opens, and the piping 20 can be accommodated within the fire protection zone penetrating member 1 through the expanding slot 3.

EXAMPLE 2

Figure 12:
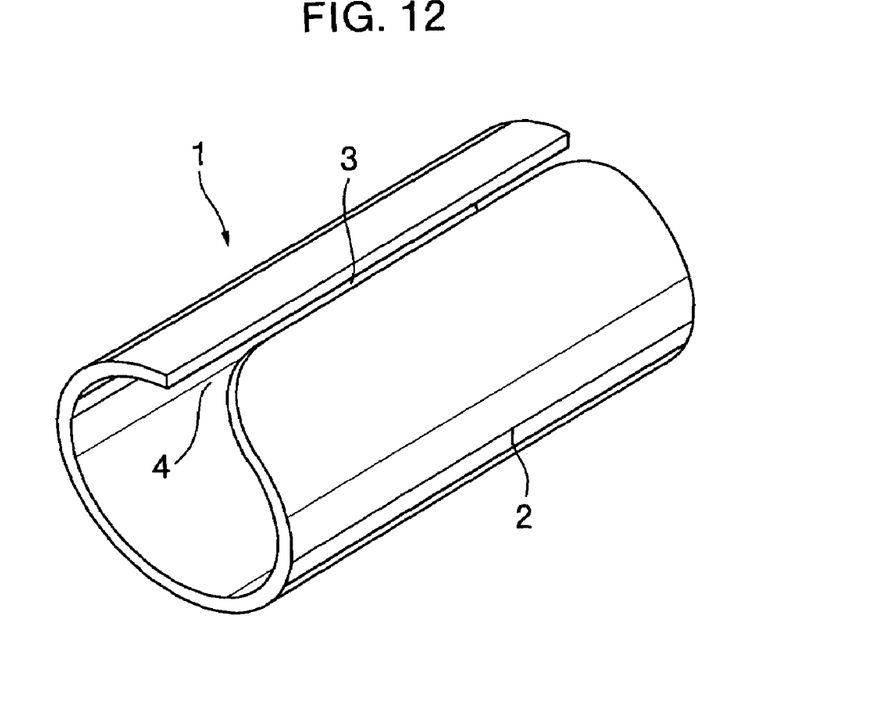
FIG. 12 is an explanatory view showing a fire protection zone penetrating member in which a cross section of the cylindrical body is oval.
Figure 13:
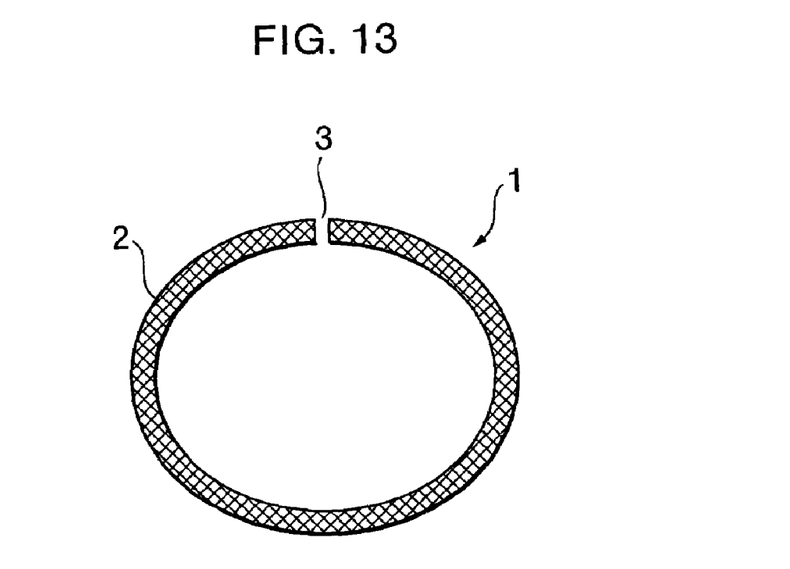
FIG. 13 is a cross-sectional view showing the fire protection zone penetrating member shown in FIG. 12.

A cylindrical body 2 has an oval cross section according to this example. The fire protection zone penetrating member 1 in this example 2 has an oval cross section with a piping inlet section 4 provided at one edge of the expanding slot 3 as shown in FIG. 12 and FIG. 13.

Figure 14:
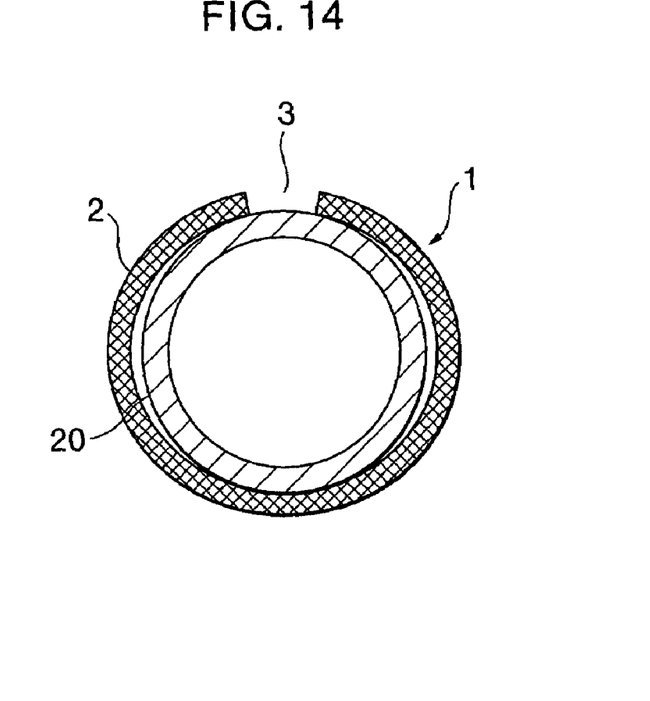
FIG. 14 is an explanatory view showing the state where the fire protection zone penetrating member has been set on piping with a small diameter.
Figure 15:
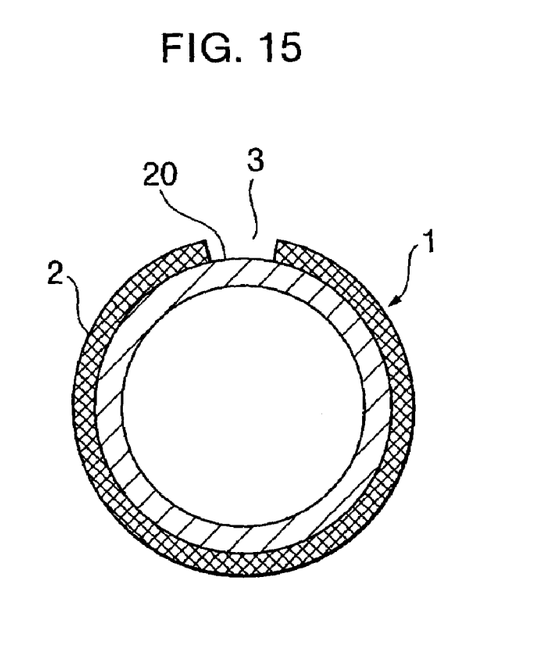
FIG. 15 is an explanatory view showing the state where the fire protection zone penetrating member has been set on piping with a large diameter.

Because of this feature, the fire protection zone penetrating member 1 can be applied to piping with an external diameter in a wide range from that equal to an inner diameter of the fire protection zone penetrating member 1 in the smaller diameter side thereof as shown in FIG. 14 up to that larger than the inner diameter in the larger diameter side thereof as shown in FIG. 15.

EXAMPLE 3

Figure 16:
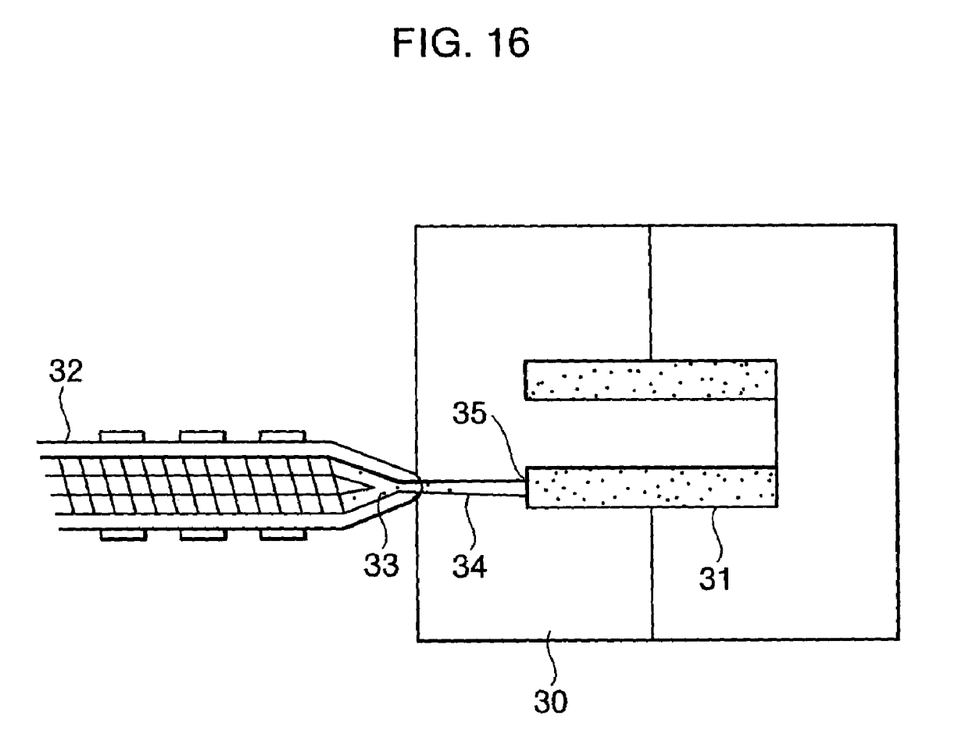
FIG. 16 is an explanatory view showing the state where the fire protection zone penetrating member according to the present invention is being formed with an injection molding machine.

The fire protection zone penetrating member 1 is molded with an injection molding machine (as shown in FIG. 16) in this example.

In FIG. 16, the reference numeral 30 indicates a die, and a cavity 31 is formed within this die 30. By filling melted thermally expanding graphite 33 in this cavity 31 via spool 34 and a gate 35 from a cylinder 32, the fire protection zone penetrating member 1 as shown in FIG. 1 to FIG. 8, the fire protection zone penetrating member 1 with the metal plate 5 shown in FIG. 9 in-molded thereon, or that having an oval cross section as shown in FIG. 12 or FIG. 13 can be formed.

As described above, in the present invention, any of thermally expanding graphite, thermally expanding rubber, and thermally expanding resin is formed into a cylindrical form with an expanding slot provided thereon to provide a fire protection zone penetrating member, and a piping inlet section (cut) is provided at an edge (entrance) of the expanding slot, so that the fire protection zone penetrating member can easily be set on or removed from piping or cabling with a one-touch operation (claims 1 to 4).

In the fire protection zone penetrating member made from thermally expanding graphite, thermally expanding rubber, or thermally expanding resin according to the present invention, a metal plate is attached to the entire peripheral surface or to some portions thereof, so that mutual interference never occurs, even if a plurality of piping or the like penetrating through one through-hole are provided side by side, when the piping or the like thermally expands, and therefore the performance can fully be achieved.

Further the fire protection zone penetrating member according to the present invention has an oval cross section in one embodiment thereof, so that the member can be applied to piping with a diameter in a wide range, and therefore the required dimensional types of the product can be reduced, which allows reduction of the manufacturing cost.

Further as the fire protection zone penetrating member according to the present invention can be manufactured by means of injection molding, so that the productivity is very high and can be manufactured with low cost. In addition, as the known in-molding method can be employed for attaching a metal plate to an external peripheral surface of the fire protection zone penetrating member, even the fire protection zone penetrating member with a metal plate attached thereto can be produced with low cost.

What is claimed is:

1. A fire protection zone penetrating member, comprising:
   a cylindrical body formed of thermally expanding graphite, thermally expanding rubber, or thermally expanding resin, said cylindrical body having a first cylindrical body edge and a second cylindrical body edge, said first cylindrical body edge being located at a spaced location from said second cylindrical body edge to define an expanding slot extending in a longitudinal direction of said cylindrical body, said first cylindrical body edge and said second cylindrical body edge defining a V-shaped cut piping inlet section located at one end of said cylindrical body, said cylindrical body having an oval cross section and an outer cylindrical body surface;
   a first metal plate adhered to said outer cylindrical body, said first metal plate being located at a spaced location from said first cylindrical body edge;
   a second metal plate adhered to said outer cylindrical body, said second metal plate being located at a spaced location from said second cylindrical body edge, said second metal plate being located at a spaced location from said first metal plate such that said first metal plate is opposite said second metal plate.

2. The fire protection zone penetrating member according to claim 1, wherein said first cylindrical body edge and said second cylindrical body edge define another V-shaped cut piping inlet section located at another end of said cylindrical body.

3. The fire protection zone penetrating member according to claim 1, wherein said thermally expanding rubber includes 40 to 50 weight % of flame-resistant rubber, 10 to 15 weight % of an inorganic filler, 20 to 25 weight % of an inorganic expanding material, 10 to 15 weight % of softener and 3 to 5 weight % of metal oxide.

* * * * *